(12) United States Patent
Richard et al.

(10) Patent No.: US 11,001,276 B2
(45) Date of Patent: May 11, 2021

(54) CABLE TRANSPORTATION INSTALLATION

(71) Applicant: POMA, Voreppe (FR)

(72) Inventors: Jérôme Richard, Crolles (FR); André Payan, Grenoble (FR)

(73) Assignee: POMA, Voreppe (FR)

( * ) Notice: Subject to any disclaimer, the term of this patent is extended or adjusted under 35 U.S.C. 154(b) by 288 days.

(21) Appl. No.: 16/085,352

(22) PCT Filed: Apr. 11, 2017

(86) PCT No.: PCT/FR2017/050870
§ 371 (c)(1),
(2) Date: Sep. 14, 2018

(87) PCT Pub. No.: WO2017/182736
PCT Pub. Date: Oct. 26, 2017

(65) Prior Publication Data
US 2019/0092351 A1    Mar. 28, 2019

(30) Foreign Application Priority Data

Apr. 22, 2016  (FR) ...................... 1653582

(51) Int. Cl.
*B61B 12/02* (2006.01)
*B61B 7/02* (2006.01)

(52) U.S. Cl.
CPC .............. *B61B 12/026* (2013.01); *B61B 7/02* (2013.01); *Y02T 30/00* (2013.01)

(58) Field of Classification Search
CPC .... B61B 3/00; B61B 5/00; B61B 7/00; B61B 7/02; B61B 7/04; B61B 9/00; B61B 11/00; B61B 11/002; B61B 11/004; B61B 12/00; B61B 12/007; B61B 12/12; B61B 12/122; B61B 12/127
See application file for complete search history.

(56) References Cited

U.S. PATENT DOCUMENTS

2015/0083016 A1*  3/2015  Fessler ................. B61B 12/026
                                                                104/112

FOREIGN PATENT DOCUMENTS

| DE | 19704825 A1 | 11/1997 |
|----|-------------|---------|
| EP | 0207850 A1 | 1/1987 |
| EP | 0281205 A2 | 9/1988 |
| FR | 2496029 A1 | 6/1982 |
| WO | 2009/130239 A1 | 10/2009 |
| WO | 2011/045808 A1 | 4/2011 |

* cited by examiner

*Primary Examiner* — Robert J McCarry, Jr.
(74) *Attorney, Agent, or Firm* — Oliff PLC

(57) ABSTRACT

A cable transportation installation, including an aerial hauling cable, a vehicle having an attachment device to attach the vehicle to the hauling cable, a structure on which at least one sheave is mounted movable between a first position in which the at least one sheave is in contact with the hauling cable and a second position in which the at least one sheave is separated from the hauling cable, and at least one actuating device coupled to the at least one sheave and configured to exert a first force on the at least one sheave in order to move the at least one sheave to the first position, and to exert a second force on the at least one sheave in order to move the at least one sheave to the second position.

9 Claims, 7 Drawing Sheets ions, and more particularly to transportation installations with an
CABLE TRANSPORTATION INSTALLATION

BACKGROUND OF THE INVENTION

The invention relates to cable transportation installataerial hauling cable.

STATE OF THE ART

At present, aerial hauling cable transportation installations comprise towers in so as be able to get past obstacles arising from the topographical configuration. These towers generally comprise sheaves, referred to as guide sheaves, in order to be able to deflect the hauling cable upwards or downwards with a vertical curvature. To pass these towers, the grips of the vehicles attached to the hauling cable therefore have to be designed so as to be able to pass over the sheaves when the vehicles pass the structure. Passing the towers is a complex affair as the sheaves have to allow the grips of the vehicles to pass while at the same time continuing to perform their function of deflecting the hauling cable.

Furthermore, certain aerial hauling cable transportation installations comprise systems to negotiate both left-hand and right-hand curves with respect to the running direction of the hauled vehicles. But these systems are much more complex to implement on account of the difficulty for the grips to be able to pass in combination with the guide sheaves of the hauling cable.

Curves are generally negotiated by means of an intermediate station, called deflection station, located between the two terminal stations, where the vehicles are detached from the hauling cable. But this configuration requires having an intermediate station at each curve of the installation.

French Patent application FR2496029 can be cited which discloses an aerial cableway transporter, presenting a curve, the cable being guided in the curve by guiding elements arranged on the inner side of the curve, and in which the hauled vehicles are equipped with a hanger arm extending on the same side of the cable on the outside of the curve so that the guiding elements do not hamper the passage of the hanger arms. The transporter further comprises a transfer device, located in a loading and/or unloading station of the installation, to take up the vehicles detached from the cable and to present them on the cable to be attached in a position where the hanger arm is situated on the outside of the curve. But the transfer device is complex to reverse the position of the vehicles, and furthermore, these vehicles have to comprise a cabin, or a chair, which can rotate around the hanger arm in order to be able to place the entrance to the vehicle on the correct side of the loading and/or unloading area.

International Patent application WO2011/045808 can be cited which discloses an aerial hauling cable transportation installation, comprising a vehicle equipped with a detachable grip configured to couple the vehicle to the aerial hauling cable in removable manner. The vehicle is provided with an opening/closing mechanism of the grip located vertical to the grip to enable the vehicle to negotiate a curve, i.e. a horizontal deflection. But the opening/closing mechanism is bulky and prevents the vehicle from passing underneath compression towers, i.e. where the cable undergoes a vertical deflection, which reduces the ability of the vehicle to pass the towers.

American Patent application US2015/0083016 can further be cited which discloses an aerial hauling cable transportation installation, comprising two carrying cables to transport the vehicles between two terminal stations, a hauling cable to haul the vehicles, and a tower supporting the carrying cables and where the carrying cables follow a curved path. Furthermore, the structure comprises several support sheaves to guide the hauling cable inside the tower. In this installation, a support sheave is fitted pivotally heightwise and its position is adjusted by the action of an adjustment force exerted by a bias spring, a motor, or a weight. The axis of rotation of the sheave has a small incline with respect to the horizontal to enable the hauling cable to be curved inside the tower while continuing to perform its sheave function which is to support the cable. In other words, when the vehicle is situated on the line before the tower, the hauling cable is located in a groove of the sheave and exerts a pressure on the sheave, and when the vehicle passes the tower, the vehicle carriage lifts the hauling cable which is no longer in contact with the sheave, and the adjustment force moves the sheave towards the carriage so that the cable can return to its place in the groove after the vehicle has passed the tower. But the small incline of the support sheaves does not allow the hauling cable be curved any further and means that the tower has to have a great length in order to obtain larger direction change angles.

German Patent application DE19704825A1 can also be cited which discloses a cable car comprising a tower on which a thrust roller is fitted sliding between a first position where it is in contact with the cable and a second position where it is separated from the cable, and a motor to displace the thrust roller. But the motor requires a power supply which has to be provided at the location of the tower.

OBJECT OF THE INVENTION

One object of the invention consists in remedying these drawbacks, and more particularly in providing an aerial hauling cable transportation installation suitable for any type of grip to attach the vehicles, i.e. that can be independent from the lateral and/or vertical dimensions of the grips.

Another object of the invention consists in providing an installation which enables the hauled vehicles to negotiate curves.

According to one feature of the invention, a cable transportation installation is proposed, comprising
 an aerial hauling cable,
 a vehicle comprising an attachment device to attach the vehicle to the hauling cable,
 a structure on which at least one sheave is mounted movable between a first position in which the sheave is in contact with the hauling cable and a second position in which the sheave is separated from the hauling cable, and
 at least one actuating device coupled with said at least one sheave and configured to exert a first force on the sheave in order to move the sheave to the first position.

Said at least one actuating device is configured to exert a second force on the sheave in order to move the sheave to the second position.

Accordingly, the sheaves can thus be moved away when the grips of the vehicles pass when the vehicle passes the structure. The moment at which the sheave is separated from the hauling cable can then be mastered. Advantageously, the sheave is separated before the grip touches the sheave. When the vehicle passes the structure, the grip is no longer hampered by the deflection sheaves, and any type of grip can be allowed to pass, whatever its dimensions. According to yet another advantage, the hauling cable can be curved with all types of vertical or horizontal curvatures, which gives the vehicles the possibility of negotiating both left-hand and right-hand curves.

The vehicle can comprise a control device configured to control said at least one actuating device in order to move the sheave.

Synchronisation between the passage of the vehicle inside the structure and moving of the sheaves is thereby facilitated.

According to one embodiment, the control device is configured to control said at least one actuating device remotely in order to move the sheave.

According to another embodiment, the control device is a trigger configured to control said at least one actuating device when the trigger is in contact with said at least one actuating device.

According to one embodiment, said at least one actuating device comprises an actuator mounted movable between an extended position in which the sheave occupies its first position and a retracted position in which the sheave occupies its second position, the actuator being provided with a roller, and the trigger comprises a first rail against which the roller runs to move the actuator to its retracted position in order to exert the second force, and a second rail against which the roller runs to move the actuator to its extended position in order to exert the first force.

According to another embodiment, said at least one actuating device comprises an actuator mounted movable between an extended position in which the sheave occupies its first position and a retracted position in which the sheave occupies its second position, the actuator being provided with first and second rollers, and the trigger comprises a first rail against which the first roller runs to move the actuator to its retracted position in order to exert the second force, and a second rail against which the second roller runs to move the actuator to its extended position in order to exert the first force.

Said at least one actuating device can comprise a bias element configured to enable the sheave to occupy the second position, and to exert the first force on the sheave.

The trigger can comprise a first counter-rail forming, with the first rail, a guide for the first roller, a second counter-rail forming, with the second rail, a guide for the second roller, and an intermediate rail connecting the first and second rails, said at least one actuating device comprising a holding means to keep the first and second rollers pressing against the intermediate rail.

Said at least one actuating device can comprise a blocking system configured to occupy a blocked state providing a rigid support for the hauling cable on the associated sheave occupying the first position, and a released state in which the blocking system is movable to allow the associated sheave to occupy the second position.

Advantageously, said at least one actuating device comprises a body and the blocking system forms a toggle joint connecting the sheave to the body.

Accordingly, a rigid support can be provided for the hauling cable which secures running of the cable when the installation is in operation.

According to one advantage, the vehicle comprises a rolling means and the structure comprises a guide structure configured to accommodate the rolling means so that the vehicle can run on the guide structure.

The vehicle can therefore be stabilised with respect to the hauling cable when the sheaves are separated from the structure.

Said at least one sheave can be mounted movable in rotation around a vertical axis of rotation.

This configuration enables the vehicles to take curves by diverting the hauling cable horizontally.

The installation can comprise several sheaves mounted successively on the structure along a curve in order to divert the hauling cable between two ends of the structure, and comprise several actuating devices respectively coupled with the sheaves.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
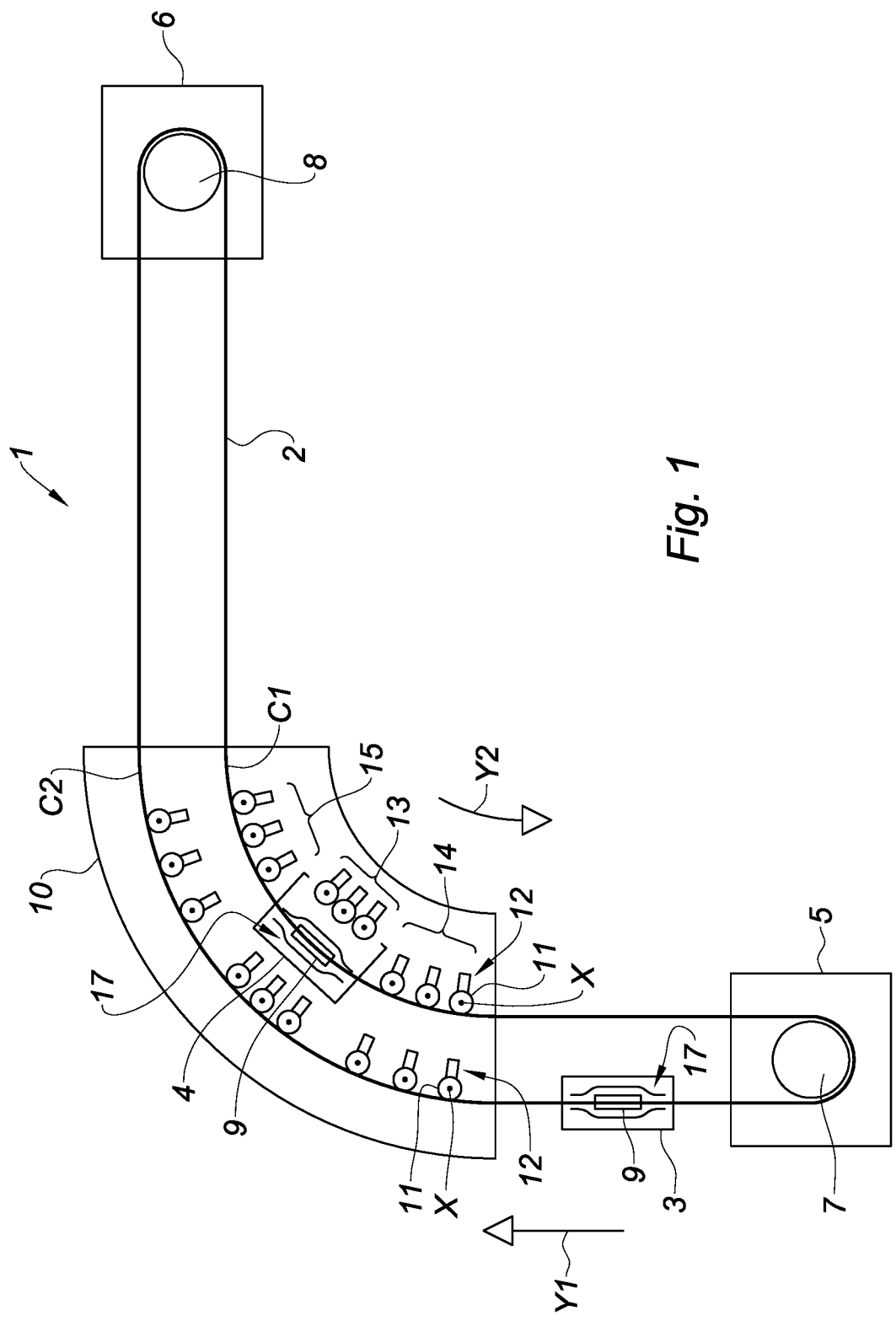
FIG. 1 schematically illustrates a top view of an embodiment of a cable transportation installation according to the invention.
Figure 2:
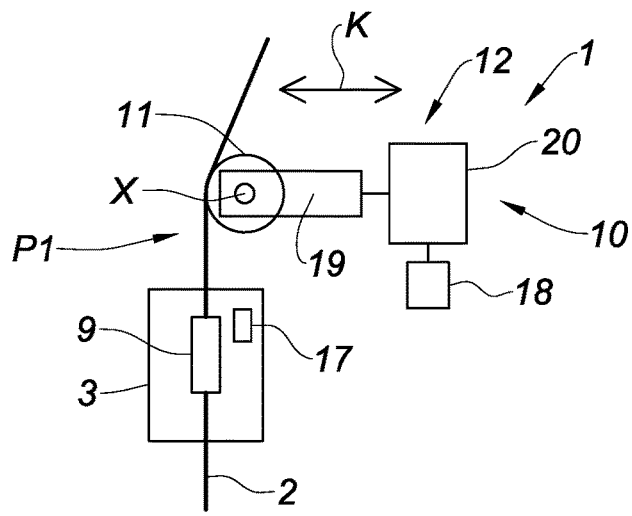
FIGS. 2 to 5 schematically illustrate top views of different embodiments of the control device and of the actuating device.

In FIG. 1, an embodiment of a transportation installation 1 by cable 2 has been represented. The installation 1 comprises an aerial hauling cable 2, at least one vehicle 3, 4 designed to be hauled by the cable 2 to transport people or goods. The installation 1 can be of any type, for example of monocable type, as illustrated in FIG. 1, or bicable type, with fixed or detachable grips, with a continuous or to-and-fro cable. A monocable installation comprises a single cable which is both carrying and hauling cable, a bicable installation comprises at least one hauling cable and at least one carrying cable. A fixed grip installation comprises vehicles which are attached in permanent manner to the hauling cable, a detachable installation comprises vehicles attached in removable manner to the hauling cable. A continuous cable installation comprises a hauling cable which runs in a closed loop between two terminal stations of the installation and the vehicles run in continuous manner along the hauling cable. A to-and-fro installation comprises a vehicle which makes an outward and an inward journey on the same track between two terminal stations. In FIG. 1, a detachable monocable installation 1 with continuous cable 2 has been represented. The installation 1 comprises two terminal stations 5, 6 for loading/unloading of people in the vehicles 3, 4. The installation 1 further comprises a drive terminal 5 provided with a motor to drive a driving pulley 7 so as to make the hauling cable 2 move. The installation 1 also comprises a return terminal 6 comprising a return pulley 8 for tensioning the hauling cable 2. The vehicles 3, 4 are further attached to the hauling cable 2 and kept above ground level, and the hauling cable 2 is then said to be aerial and the transportation installation 1 is a cable car.

Each vehicle 3, 4 comprises a cabin that is able to be a compartment designed to receive passengers or designed to contain goods, for example waste products, and the installation is of the gondola lift type. Each vehicle 3, 4 can also comprise chairs, in particular without side panels, and the installation is of the chairlift type. Each vehicle 3, 4 of the installation 1 comprises an attachment device 9 to attach the vehicle 3, 4 to the hauling cable 2. The attachment device 9 can be of fixed or detachable grip type.

The installation 1 also comprises one or more structures 10 where the hauling cable runs. The structure 10 is a vertical structure serving the purpose of supporting the hauling cable 2. The structure 10 can be a line tower, i.e. a tower situated between the two terminal stations 5, 6. A line tower can serve the purpose of support, compression, or horizontal deflection of the hauling cable. A structure 10 can also be an internal support structure located in a terminal station 5, 6 or in an intermediate station. A deflection structure 10, also called horizontal deflection tower, to provide a curve of the installation 1, has been represented in FIG. 1. An example of progression of a first vehicle 3 towards the return terminal 6, in the direction represented by the reference Y1, and of progression of the second vehicle 4 running in the opposite direction Y2 towards the drive terminal 5, have also been represented.

In general manner, the structure 10 comprises at least one sheave 11 mounted in movable manner. A sheave is a small wheel provided with a groove designed to receive the hauling cable 2. The sheave 11 is mounted movable in rotation around a main axis of rotation X. The main axis of rotation X can be vertical, i.e. the sheave 11 is a horizontal deflection sheave, and it enables the vehicle to take a left-hand or a right-hand curve. The main axis of rotation X can also be horizontal, i.e. the sheave 11 is a compression or a support sheave, and the vehicle can be moved upwards or downwards. Preferably, the structure 10 comprises several sheaves 11 mounted successively on the structure 10 along a curve C1, C2, in order to deflect the cable 2 located between two ends of the structure 10 and according the curve C1, C2. For example, eighteen sheaves have been represented in FIG. 1, and these sheaves 11 are in particular called deflection sheaves as their main axes of rotation X are vertical and they enable the hauling cable 2 to be curved horizontally inside the structure 10. The curvature is obtained by a deflection of the cable 2 which follows the arrangement of the sheaves 11 along the curve C1, C2. Furthermore, at least one sheave 11 is mounted movable between a first position P1 in which the sheave 11 is in contact with the hauling cable 2, as illustrated in FIGS. 2 to 5 and 7, and a second position P2 in which the sheave 11 is separated from the hauling cable 2, as illustrated in FIGS. 8 and 9. What is meant by "separated from the hauling cable 2" is the fact that the sheave 10 is not in contact with the hauling cable 2. To move from the first position P1 to the second position P2, the sheave 11 can be mounted movable in translation along an axis of translation perpendicular to a longitudinal axis of the cable 2. As a variant, the sheave 11 is mounted on an arm which is mounted rotating around an additional axis of rotation in order to be able to separate the sheave 11 from the cable 2.

In order to be able to move the sheaves 11 to the first or second positions P1, P2, the installation 1 comprises at least one actuating device 12 coupled to at least one movably-mounted associated sheave 11. The installation 1 preferably comprises several actuating devices 12 respectively coupled to several sheaves. In other words, each sheave 11 of the structure 10 is associated with an actuating device 12 which moves the sheave 11 to the first or second position P1, P2. More particularly, each actuating device 12 is configured to exert a first force on the associated sheave 11 so as to move it to the first position P1, and to exert a second force on the associated sheave 11 so as to move it to the second position P2.

The general operating principle of the installation 1 is that when no vehicle is passing the structure 10, the sheaves of the structure 10 occupy their first position P1. Then, when a vehicle 4 is passing the structure 10, the actuating devices 12 associated with the sheaves 11 of a group 13 exert a second force on the sheaves 11 of the group 13 to move them to their second position P2. In this way, a free space is created between the hauling cable 2 and the sheave 11 moved to its second position P2, which facilitates passage of the grip 9 at the level of the sheaves 11 when passing the structure 10. When the vehicle 4 has passed the group 13 of sheaves 11, the actuating devices 12 exert the first force on the sheaves 11 of the group 13 to move them to their first positions P1. The sheaves 11 can therefore be separated from the hauling cable 2 when the vehicle 3, 4 passes the structure 10. Advantageously, the sheaves 11 situated at the level of the grip 9 of the vehicle 3, 4 are separated when the vehicle passes the structure 10. A first group 14 of sheaves initially in the first position P1 where they are in contact with the hauling cable 2 has been represented in FIG. 1. The sheaves 11 of the first group 14 have not yet been passed and their initial position therefore corresponds to the first position P1. The second group 13 corresponds to the sheaves 11 occupying their second position P2 where they are separated from the cable 2. A third group 15 has also been represented for which the sheaves 11 have been returned to their first position P1 after the vehicle 4 has passed.

Advantageously, in order to be able to synchronise movement of the sheaves 11 with passage of the grip 9, the vehicles 3, 4 can comprise a control device 17, 17a configured to control at least one actuating device 12 in order to move the associated sheave 11.

The control device 17, 17a can be of different types, for example of electronic type or of mechanical type. It can also be envisaged for a station 5, 6 of the installation to be provided with a control device of electronic type 17 configured to perform remote control of the actuating devices 12 when the vehicles pass the sheaves 11 of the structures 10. In general manner, the actuating device 12 comprises a sheave-support arm 19 on which the associated sheave 11 is mounted movable in rotation around its main axis X. An embodiment in which the control device 17, 17a is of electronic type has been represented in FIG. 2. According to this embodiment, the installation 1 comprises a motor 20 to move the arm and therefore the sheave 11. For example, the electronic control device 17 comprises a transmission unit of a control signal addressed to a receiver unit 18 designed to detect the transmitted signal to control the actuating device 12 so that the latter exerts the first or second force on the associated sheave 11 to move the latter. The directions of movement of the sheaves 11 are represented by the reference K. The control signal is preferentially transmitted when the vehicle 3 approaches the structure 10 and the sheave 11 is then moved to its second position P2 before the grip 9 comes into contact with the sheave 11.

After passage of the grip 9, the transmission unit transmits a second control signal, called closing signal, addressed to the receiver unit 18. The receiver unit 18 can then control the actuating device 12 to exert the first force to move the associated sheave 11 back to its first position P1 in contact with the hauling cable 2. As a variant, the electronic control device 17 comprises a radiofrequency tag which can be detected by a radiofrequency transceiver located on the structure 10. In this variant, the transceiver controls the actuating device 12 to move the sheave 11 to the second position P2 when the transceiver detects the tag of the vehicle 4, and controls the actuating device 12 to move the sheave 11 to the first position P1 when the transceiver no longer detects the tag of the vehicle 4, i.e. when the grip 9 of the vehicle has passed the sheave 11 of the structure 10.

Figure 3:
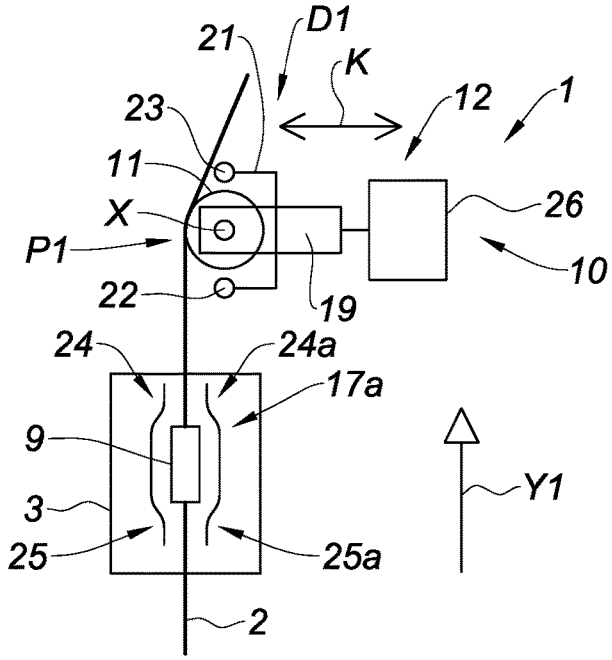
Figure 4:
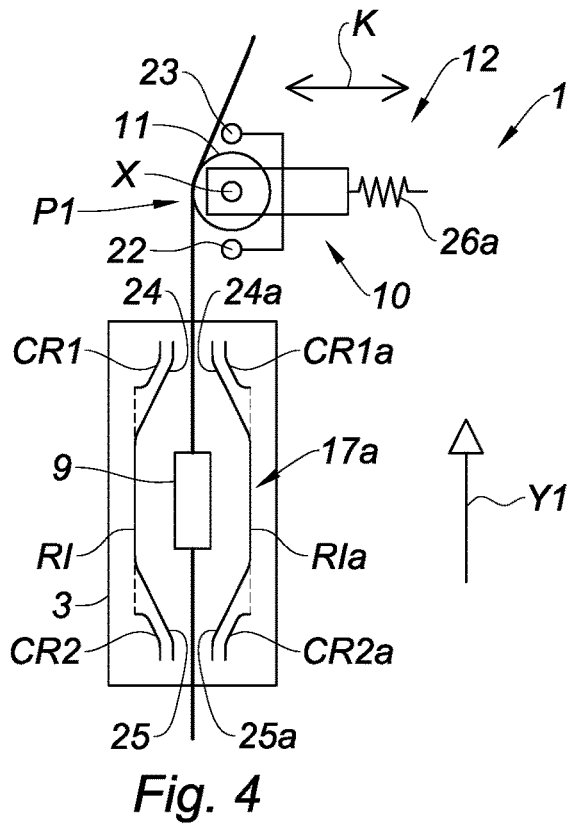
Figure 5:
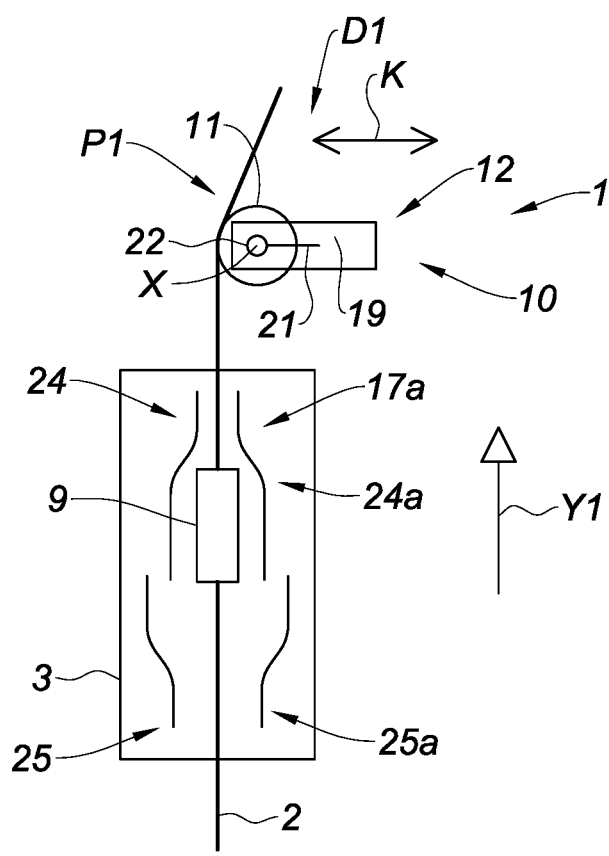

In FIGS. 3 to 5, other embodiments have been represented in which the control device 17, 17a is of mechanical type. In general manner, when the control device 17, 17a is of mechanical type, it is a trigger 17a configured to control the actuating devices 12 when the trigger 17a is in contact with the actuating devices 12. Such a control device 17a of mechanical type enhances the synchronisation between passing of the grip 9 and the separation movement of the sheaves 11 from the hauling cable 2. The actuating device 12 comprises the movable sheave-support arm 19 and an actuator 21 also mounted movable between an extended position D1, illustrated in FIGS. 3 to 5 and 7, in which the sheave 11 occupies its first position P1, and a retracted position R1, illustrated in FIGS. 8 and 9, in which the sheave 11 occupies its second position P2. The actuator 21 further comprises first and second rollers 22, 23, respectively called entry and exit rollers. The entry roller 22 is the first roller which comes into contact with the trigger 17a when the vehicle passes the structure 10, and the exit roller 23 is the last roller which comes into contact with the trigger 17a to move the sheave 11 back to the first position P1. As a variant, the actuator 21 comprises a single roller 22 as illustrated in FIG. 5. The two rollers 22, 23 enable the length of the trigger 17a of the vehicles 3, 4 to be reduced. The trigger 17a further comprises at least one first rail 24, 24a against which the first roller 22 runs to move the actuator 21 to its retracted position R1 in order to exert the second force to move the sheave 11 to its second position P2. The trigger 17a further comprises at least one second rail 25, 25a against which the second roller 23 runs to move the actuator 21 to its extended position D1 in order to exert the first force to move the sheave 11 to its first position P1. In FIGS. 3 to 5, the vehicle 3 comprises two first rails 24, 24a, in particular a left-hand first rail 24 and a right-hand first rail 24a situated on each side of the grip 9. The vehicle 3 also comprises two second rails 25, 25a, a left-hand second rail 25 and a right-hand second rail 25a also situated on each side of the grip 9. The rails 24, 24a and 25, 25a can be positioned in symmetrical manner with respect to the grip 9 so as to be able to take right-hand and left-hand curves, and to run in both running directions Y1, Y2 of the hauling cable 2. Furthermore, the first rails 24, 24a are preferentially two curved guide rails, in particular concave in the direction of the outside of the vehicle 3, to move the first roller 22, and therefore the actuator 21, to the retracted position R1. The second rails 25, 25a are also two curved guide rails, in particular concave in the direction of the outside of the vehicle 3, to enable the second roller 23, and therefore the actuator 21, to return to the extended position D1.

In the embodiments illustrated in FIGS. 3 and 4, the left-hand first and second rails 24, 25 are contiguous and form a single rail, noted left-hand rail. The left-hand rail 24, 25 then comprises an intermediate rail RI connecting the left-hand first and second rails 24, 25. When the rails 24, 24a and 25, 25a are positioned in symmetrical manner, the right-hand first and second rails 24a, 25a are also contiguous and form a single rail, noted right-hand rail. The right-hand rail 24a, 25a then comprises an intermediate rail RIa connecting the right-hand first and second rails 24a, 25a. In this case, the first and second rollers 22, 23 can run against the intermediate rail RI, RIa.

According to the embodiment illustrated in FIG. 3, the actuating device 12 further comprises a bias element 26 configured to keep the second roller 23 pressing against the second rail 25a. The bias element 26 is configured to enable the associated sheave 11 to occupy the second position P2 and to exert the first force on the sheave 11 to move it back to the first position P1. Maintaining pressing enables the second roller 23 to follow the curved shape of the second rail 25, 25a and to move back the actuator 21 to its extended position D1 after passage of the grip 9. The bias element 26 can be an elastic member such as a spring, or a motorised means, for example an electric, pneumatic, hydraulic, or internal combustion motor.

According to the embodiment illustrated in FIG. 4, the trigger 17a comprises at least a first counter-rail CR1, CR1a forming, with the first rail 24, 24a, a guide for the first roller 22, and at least a second counter-rail CR2, CR2a forming, with the second rail 25, 25a, a guide for the second roller 23. In this embodiment, the actuating device 12 comprises a holding means 26a configured to keep the first and second rollers 22, 23 pressing against the intermediate rail RI, RIa. In this configuration, when the vehicle 3 passes the structure 10, the vehicle 3 moves in the direction Y1. The first roller 22 enters the guide formed by the first rail 24a and first counter-rail CR1a, and the actuator 21 is moved to its retracted position R1. The sheave 11 is thus moved to its second position P2. Then the first roller 23 leaves the guide, and the first and second rollers 22, 23 follow the intermediate rail RIa being kept pressing against the intermediate rail RIa by means of the holding means 26a. The first roller 22 passes in front of the entrance of the second guide formed by the second counter-rail CR2a and the second rail 25a, and does not enter the second guide so long as the second roller 23 is pressing against the intermediate rail RIa. Then the second roller 23 enters the second guide, and the second guide moves the actuator 21 to its extended position D1, which moves the sheave 11 back to its first position P1. It can be noted that the holding means 26a are different from the bias element 26 described beforehand. Indeed, the holding means 26a only provide a strength to keep the rollers 22, 23 against the intermediate rail RI, RIa, and it is the second guide which provides the strength to move the actuator 21 back to the extended position D1. On the contrary, in the embodiment illustrated in FIG. 3, it is the bias element 26 that provides a strength to move the actuator 21 back to the extended position D1. Holding means 26a configured to provide a lower holding force than the bias force provided by the bias element 26 can therefore be used.

An embodiment in which the first rail 24, 24a is not contiguous with the second rail 25, 25a has been represented in FIG. 5. Preferably, the actuating device 12 comprises a single roller 22. In this embodiment, it is not necessary for the actuating device 12 to comprise a bias element 26. In this case, the trigger 17a comprises a second rail 25, 25a which enables the actuator 21 to be moved back to the extended position D1. The second rail 25, 25a is spaced apart from the first rail 24, 24a and spacing created allows passage of the roller 22 which will follow the inner curvature of the second rail 25, 25a so that the actuator 21 returns to its extended position D1.

Figure 6:
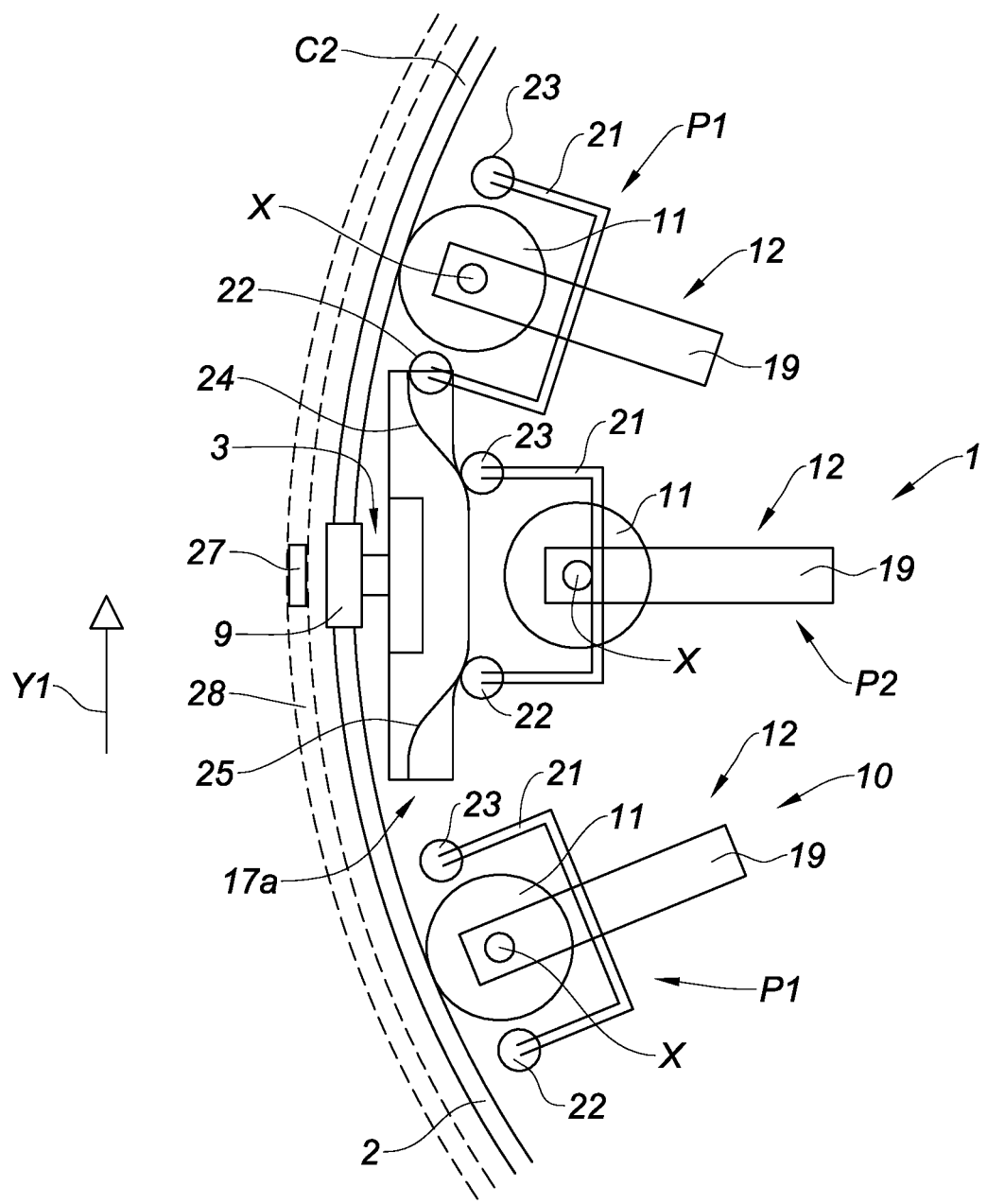
FIG. 6 schematically illustrates a top view of a structure of the installation where a vehicle is passing the structure.

In FIG. 6, another embodiment of an installation 1 has been represented in which the control device 17, 17a is also of mechanical type. In this other embodiment, the vehicle 3 comprises a rolling means 27 and the structure 10 comprises a guide structure 28 configured to receive the rolling means 27 so that the vehicle 3 can run on the guide structure 28. In particular, the guide structure extends along the curvature C2 of the hauling cable 2. In FIG. 6, the sheave 11 situated in the middle of the other two sheaves 11 is in its second position P2. The rollers 22, 23 of the associated actuating device 12 run pressing against the trigger 17a of the vehicle 3, 4. The other sheaves 11 are in their first position P1. The guide structure 28 enables the grip 9 of the vehicle 3 to hold the hauling cable 2 when movement of the sheaves 11 takes place to their second position P2.

Figure 7:
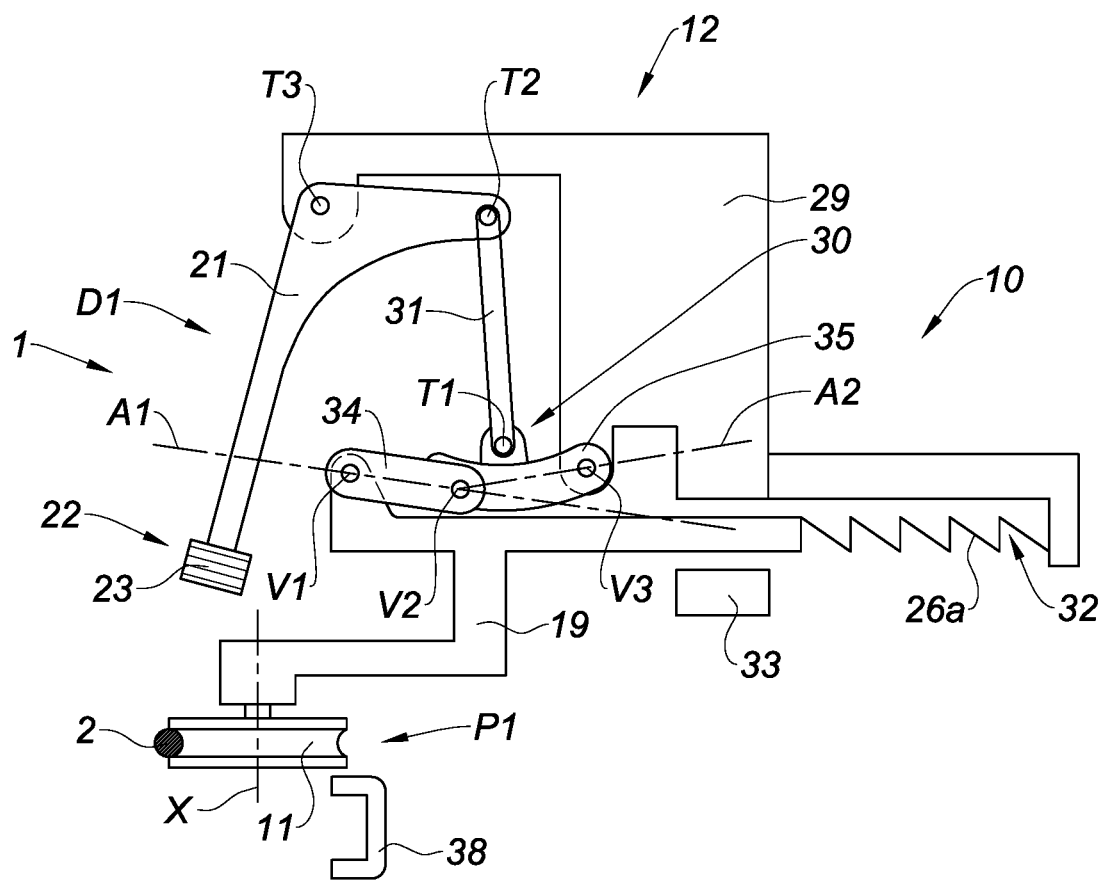
FIG. 7 schematically illustrates a front view of an embodiment of an actuating device in which a sheave occupies the first position.
Figure 8:
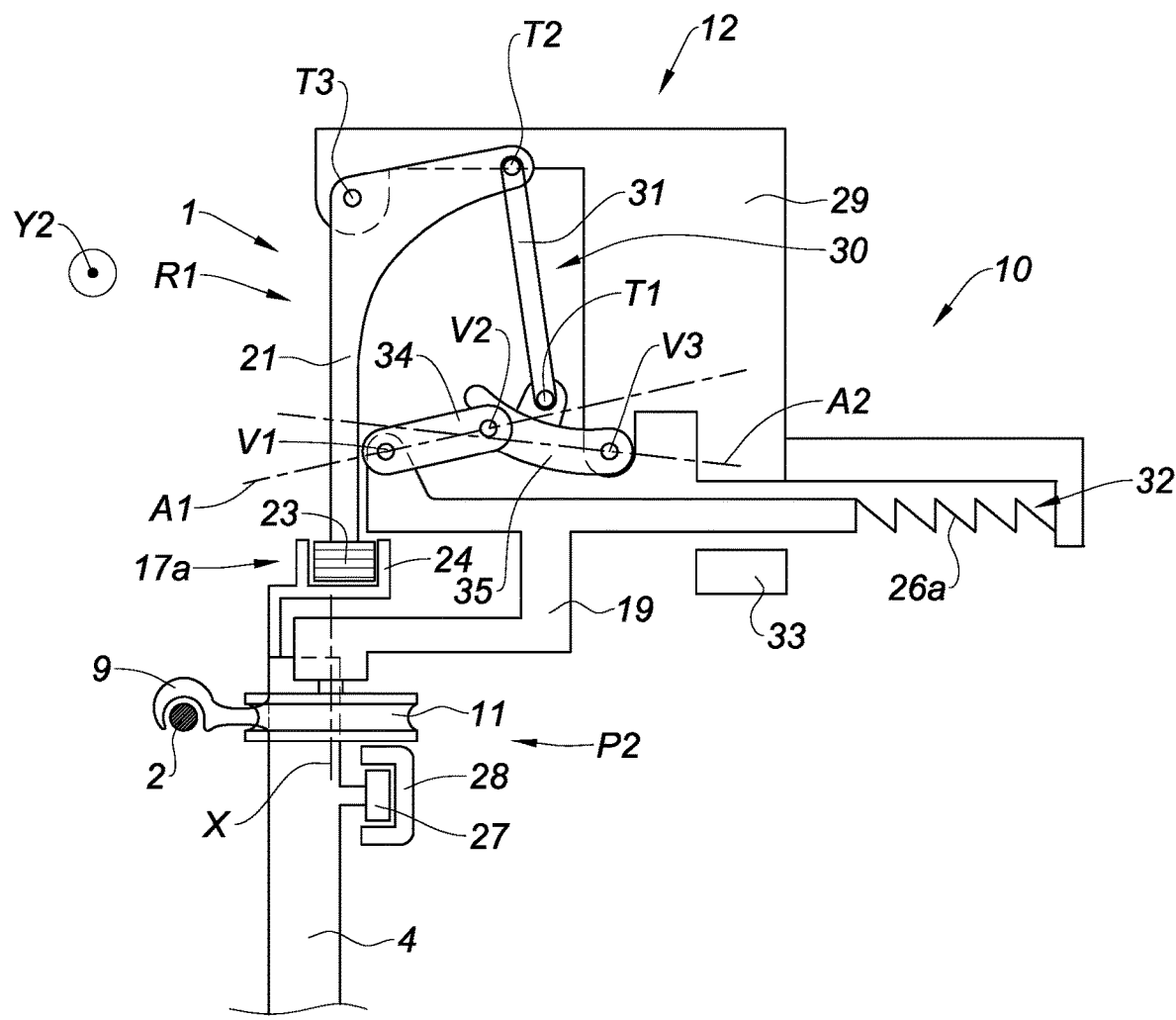
FIGS. 8 and 9 schematically illustrate two front views of the actuating device of FIG. 7 in which the sheave occupies the second position.
Figure 9:
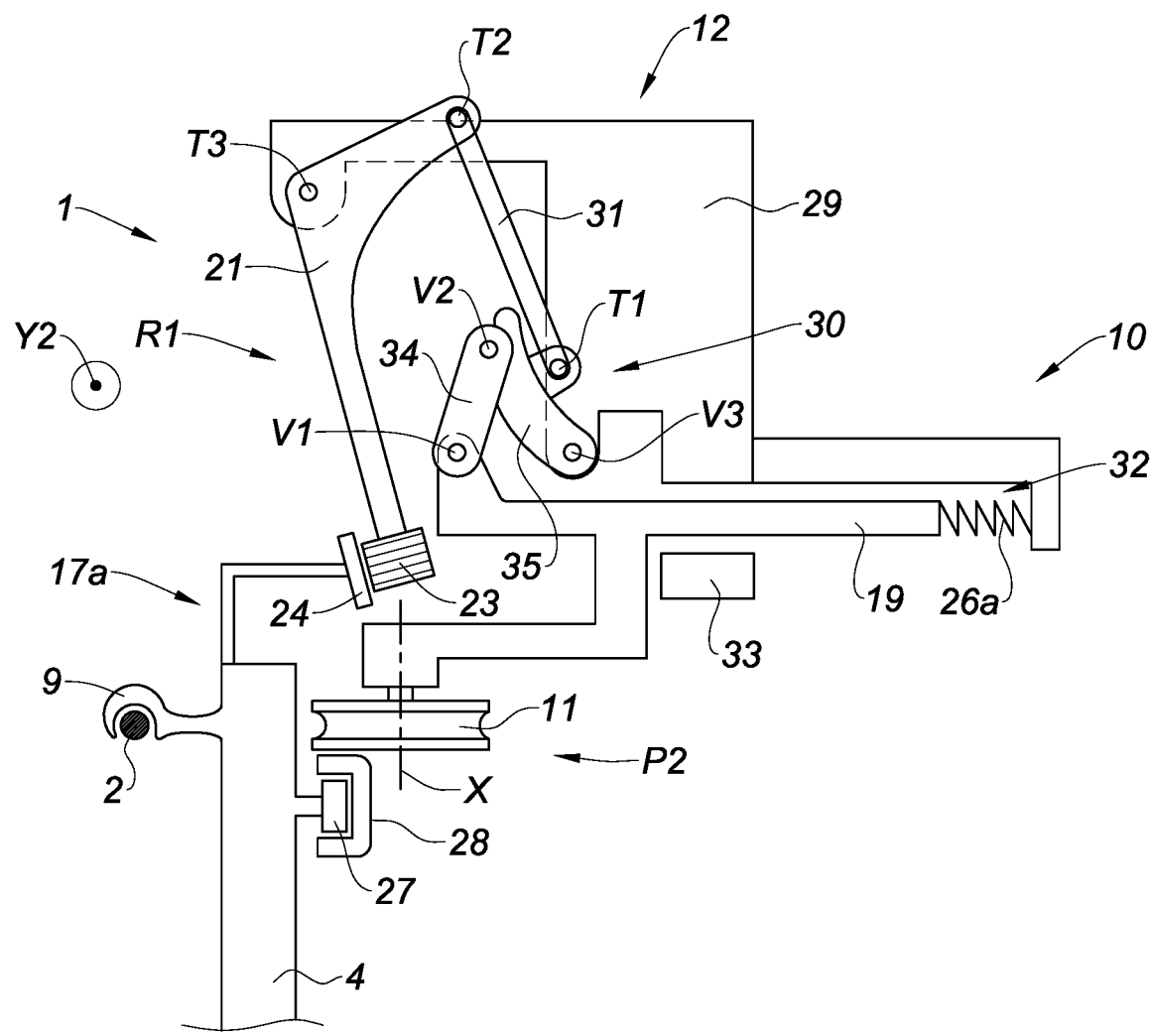

In FIGS. 7 to 9, a variant of the installation 1 has been represented in which the control device 17, 17a is also of mechanical type. The actuating device 12 comprises a body 29 and a blocking system 30. The blocking system 30 is configured to occupy a blocked state providing a rigid support of the hauling cable 2 on the associated sheave 11 occupying the first position P1, and a released state in which the blocking system 30 is movable to allow the associated sheave 11 to occupy the second position P2. More particularly, in the blocked state, the blocking system 30 blocks the sheave 11 in the first position P1 in order to provide a rigid support. For example, the blocking system 30 forms a toggle joint connecting the sheave 11 to the body 29. A toggle joint comprises two articulated rods enabling movement from one state to the other by exerting two different forces on the articulated rods. Such a blocking system 30 is different from an elastic system. Indeed, an elastic system provides a bias force which tends to bias a part to its initial position after the part has been moved. For an elastic system, a single force is provided to fold, stretch, compress or twist an elastic member, and it is the elastic member which provides the bias force. On the contrary, in the case of the blocking system 30, it is the actuating device 12 which provides the two forces to block or release the blocking system 30.

According to the variant illustrated in FIGS. 7 to 9, the body 29 is mounted fixed on the structure 10. The actuating device 12 comprises the movable sheave-support arm 19, the actuator 21 mounted movable between the extended position D1 and the retracted position R1, and a lever 31 connecting the blocking system 30 with the actuator 21 by means of two pivot links respectively T1, T2. The actuator 21 comprises the first and second rollers 22, 23 and is mounted on the body 29 by a pivot link T3. The sheave-support arm 19 is mounted sliding inside a housing 32 formed in the body 29 of the actuating device 12. The sheave-support arm 19 can therefore occupy a blocking position in which the sheave 11 occupies its first position P1, and a released position in which the sheave 11 is separated from the hauling cable 2 and the sheave 11 can occupy its second position P2, and vice versa. The blocking system 30 preferably comprises two articulated rods 34, 35. A first rod 34 is mounted on a part of the sheave-support arm 19 by a first pivot link V1, and on the second rod 35 by a second pivot link V2. The second rod 35 is for its part mounted on the body 29 of the actuating device 12 by a third pivot link V3. In particular, the first rod 34 comprises a first axis A1 passing through the first and second pivot links V1, V2, and the second rod 35 comprises a second axis A2 passing through the second and third pivot links V2, V3. When the blocking system 30 occupies its blocked state, as illustrated in FIG. 7, the first axis A1 forms a first angle with the second axis A2, and the rods 34, 35 are blocked against a stop. This configuration enables a rigid support to be provided for the hauling cable 2 on the sheave 11. When the blocking system 34 occupies its released state, as illustrated in FIGS. 8 and 9, the first axis A1 forms a second angle, different from the first angle, with the second axis A2, and the rods 34, 35 are movable. In this configuration, the sheave-support arm 19 can slide in the housing 32 and the sheave 11 can occupy its second position P2. Passing from one state to the other, in other words releasing of the blocking system 30, is achieved by passing an alignment point for which the first and second axis A1, A2 are aligned. Passing the alignment point is permitted by means of the elasticity of the hauling cable 2.

In FIG. 7, a sheave 11 has been represented occupying its first position P1, i.e. a position in contact with the hauling cable 2. In this configuration, the blocking system 30 is in its blocked state. In FIG. 8, a vehicle 3, 4 has been represented at the moment it passes the structure 10. Furthermore, the trigger 17a of the vehicle 3, 4 is in contact with the actuating device 12 to control movement of the sheave 11 to its second position P2. The blocking system 30 is in an initial released state where the sheave 11 is separated from the hauling cable 2 and where the rods 34, 35 have passed the alignment point. It is also said that the sheave 11 occupies a second initial position P2. In FIG. 9, a vehicle 3, 4 has been represented passing the structure 10, and with the actuator 21 in its retracted position R1. When the blocking system 30 is in the initial released state, the rods 34, 35 are movable, and the trigger 17a can move the first roller 22 separating it from the hauling cable 2, which has the effect of separating the actuator 21 to its retracted position R1. By moving the actuator 21, the latter transmits the second force, generated by the trigger 17a, to move the rods 34, 35 and to move the sheave-support 19 to a released position against an end stop. The released end stop position corresponds to the position in which the sheave-support arm 19 is pressing against a stop 33 provided on the body 29 of the alignment device 12. When the sheave-support 19 reaches its released end stop position, the sheave 11 occupies a position farthest separated from the hauling cable 2, also called second end stop position P2.

In other words, when the first rail 24, 24a comes into contact with the first roller 22, the first roller 22 presses against the first rail 24 and follows the curved shape of the first rail 24, which enables the first roller 22 to be offset by separating it away from the hauling cable 2. When the first roller 22 is offset, the actuator 21 and lever 31 moves the second rod 35 to release the blocking system 30. More particularly, when releasing takes place, the sheave 11 exerts a force on the hauling cable 2 in an opposite direction to that of movement of the actuator 21, and, in particular due to the elasticity of the hauling cable 2, releasing of the blocking system 30 is allowed. After passage of the grip 9, the second roller 23 of the actuating device 12 again occupies its initial position, which has the effect of moving the sheave 11 back to its first position P1. The actuating device 12 preferentially comprises the holding means 26a, which is for example a spring connecting the sheave-support arm 19 with the body 29 of the actuating device 12. The holding means 26a allows the sheave-support arm 19 to slide in the housing 32 and generates a strength to keep the rollers 22, 23 of the actuator 21 pressing against the intermediate rail RI, RIa. It can be noted that the holding means 26a does not participate in pressing of the hauling cable 2 against the sheave 11 when the sheave 11 occupies its first position P1. In this first position P1, the holding means 26a does not exert any force on the sheave 11 as the toggle joint provides a rigid support.

The invention which has just been described in the foregoing provides an aerial cable transportation installation which enables structures to be passed whatever the type of grip. The installation is particularly suitable for grips having a lateral or vertical space occupation. Furthermore, such an installation enables the vehicles to take left-hand or right-hand curves, which provides the possibility of manufacturing the installation in an environment having a large density of obstacles, in particular urban environments. Furthermore, the need to implement intermediate stations to divert the vehicles detached from the hauling cable, which stations are voluminous and complicate assembly of the installation, is circumvented.

The invention claimed is:

1. A cable transportation installation, comprising
   an aerial hauling cable,
   a vehicle comprising an attachment device to attach the vehicle to the hauling cable,
   a structure on which at least one sheave is mounted movable between a first position in which said at least one sheave is in contact with the hauling cable and a second position in which said at least one sheave is separated from the hauling cable, and
   at least one actuating device coupled with said at least one sheave and configured to exert a first force on said at least one sheave in order to move said at least one sheave to the first position, and to exert a second force on said at least one sheave in order to move said at least one sheave to the second position, said at least one actuating device comprising a blocking system configured to occupy a blocked state providing a rigid support for the hauling cable on said at least one sheave occupying the first position, and a released state in which the blocking system is movable to allow said at least one sheave to occupy the second position,
   wherein said at least one actuating device comprises a body and the blocking system forms a toggle joint connecting said at least one sheave to the body, and
   wherein the vehicle comprises a control device configured to control said at least one actuating device remotely in order to move said at least one sheave.

2. The installation according to claim 1, wherein the control device is a trigger configured to control said at least one actuating device when the trigger is in contact with said at least one actuating device.

3. The installation according to claim 2, wherein said at least one actuating device comprises an actuator mounted movable between an extended position in which said at least one sheave occupies its first position and a retracted position in which said at least one sheave occupies its second position, the actuator being provided with a roller and the trigger comprises a first rail against which the roller runs to move the actuator to its retracted position in order to exert the second force, and a second rail against which the roller runs to move the actuator to its extended position in order to exert the first force.

4. The installation according to claim 3, wherein said at least one actuating device comprises a bias element configured to enable said at least one sheave to occupy the second position, and to exert the first force on said at least one sheave.

5. The installation according to claim 2, wherein said at least one actuating device comprises an actuator mounted movable between an extended position in which said at least one sheave occupies its first position and a retracted position in which said at least one sheave occupies its second position, the actuator being provided with first and second rollers, and the trigger comprises a first rail against which the first roller runs to move the actuator to its retracted position in order to exert the second force, and a second rail against which the second roller runs to move the actuator to its extended position in order to exert the first force.

6. The installation according to claim 5, wherein the trigger comprises a first counter-rail forming, with the first rail, a guide for the first roller a second counter-rail forming, with the second rail, a guide for the second roller, and an intermediate rail connecting the first and second rails, said at least one actuating device comprising a spring to keep the first and second rollers pressing against the intermediate rail.

7. The installation according to claim 1, wherein the vehicle comprises a rolling means and the structure comprises a guide structure configured to receive the rolling means so that the vehicle can run on the guide structure.

8. The installation according to claim 1, wherein said at least one sheave is mounted movable in rotation around a vertical axis of rotation.

9. The installation according to claim 1, comprising several sheaves mounted successively on the structure along a curve in order to deflect the hauling cable between two ends of the structure, and comprising several actuating devices respectively coupled to the several sheaves.

* * * * *